US009162418B2

(12) United States Patent
Whitbeck et al.

(10) Patent No.: US 9,162,418 B2
(45) Date of Patent: Oct. 20, 2015

(54) METHOD OF MAKING A BARBED SURFACE FOR RECEIVING A THERMAL SPRAY COATING AND THE SURFACE MADE BY THE METHOD

(71) Applicant: Ford Global Technologies, LLC, Dearborn, MI (US)

(72) Inventors: Rodney G. Whitbeck, Northville, MI (US); Keith Raymond Bartle, Sterling Heights, MI (US); David Alan Stephenson, Detroit, MI (US); James William Perry, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/026,192

(22) Filed: Sep. 13, 2013

(65) Prior Publication Data

US 2014/0010977 A1    Jan. 9, 2014

Related U.S. Application Data

(62) Division of application No. 13/219,905, filed on Aug. 29, 2011, now Pat. No. 8,534,256.

(51) Int. Cl.
*F02F 1/00*    (2006.01)
*B32B 3/26*    (2006.01)
(Continued)

(52) U.S. Cl.
CPC    *B32B 3/263* (2013.01); *B21H 7/18* (2013.01); *B23B 27/24* (2013.01); *B23P 9/02* (2013.01);
(Continued)

(58) Field of Classification Search
CPC .......... F02D 17/00; F02D 15/02; F02B 75/04; B21H 7/18; F02F 1/18; F02F 1/004; F16D 65/127; B23P 9/02; B23P 15/00; C23C 4/02; B23B 27/24; Y10T 428/24479; Y10T 428/13; B32B 3/263
USPC .... 123/193.2, 668, 48 R, 48 A, 48 AA, 48 B, 123/78 R, 78 A, 78 AA, 78 B; 29/888.061
See application file for complete search history.

(56) References Cited

U.S. PATENT DOCUMENTS 5,363,821 A  * 11/1994 Rao et al. ................... 123/193.2
5,619,962 A  *  4/1997 Ikegaya et al. ............. 123/193.2
(Continued)

FOREIGN PATENT DOCUMENTS

DE    102008024313 A1    12/2009
FR           1354895 A      3/1964
(Continued)

OTHER PUBLICATIONS

France Patent and Trademark Office, Search Report for the corresponding France Application No. FR 1258013 dated Aug. 28, 2013.

*Primary Examiner* — Marguerite McMahon
(74) *Attorney, Agent, or Firm* — Damian Porcari; Brooks Kushman P.C.

(57) ABSTRACT

A method is disclosed for preparing a surface for mechanically securing a spray coating to a surface. A first series of grooves formed in the surface are intersected with a second series of grooves formed in the surface. A plurality of barbs are formed at the intersections. The spray coating is mechanically secured to the barbs that overhang the first series of grooves. The surface includes the first series of grooves and the second series of groves that intersect the first series of groves. The second series of groves form an undercut portion, or barb, at the intersections of the grooves that mechanically anchor the spray coating.

5 Claims, 4 Drawing Sheets

(51) Int. Cl.
*B23B 27/24* (2006.01)
*C23C 4/02* (2006.01)
*B23P 9/02* (2006.01)
*B23P 15/00* (2006.01)
*B21H 7/18* (2006.01)
*F02F 1/18* (2006.01)
*F16D 65/12* (2006.01)

(52) U.S. Cl.
CPC . *B23P 15/00* (2013.01); *C23C 4/02* (2013.01); *F02F 1/004* (2013.01); *F02F 1/18* (2013.01); *F16D 65/127* (2013.01); *Y10T 428/13* (2015.01); *Y10T 428/2457* (2015.01); *Y10T 428/24479* (2015.01)

(56) References Cited

U.S. PATENT DOCUMENTS

| | | | |
|---|---|---|---|
| 5,622,753 A | 4/1997 | Shepley et al. | |
| 5,934,239 A * | 8/1999 | Koriyama | 123/193.2 |
| 6,749,894 B2 | 6/2004 | Subramanian et al. | |
| 7,089,662 B2 | 8/2006 | Izquierdo et al. | |
| 7,220,458 B2 | 5/2007 | Hollis et al. | |
| 7,584,735 B2 | 9/2009 | Boehm et al. | |
| 7,621,250 B2 | 11/2009 | Iizumi et al. | |
| 7,851,046 B2 | 12/2010 | Nishimura et al. | |
| 8,091,236 B2 | 1/2012 | Okada et al. | |
| 2001/0029770 A1 | 10/2001 | Hoopman et al. | |
| 2005/0044707 A1 | 3/2005 | Izquierdo et al. | |
| 2008/0260958 A1 | 10/2008 | Sekikawa et al. | |
| 2009/0175571 A1 | 7/2009 | Boehm et al. | |
| 2010/0031799 A1 | 2/2010 | Ast et al. | |
| 2010/0101526 A1 | 4/2010 | Schaefer et al. | |
| 2010/0326270 A1 | 12/2010 | Doerfler et al. | |

FOREIGN PATENT DOCUMENTS

| | | |
|---|---|---|
| FR | 2430438 A1 | 2/1980 |
| WO | 0037704 | 6/2000 |

* cited by examiner

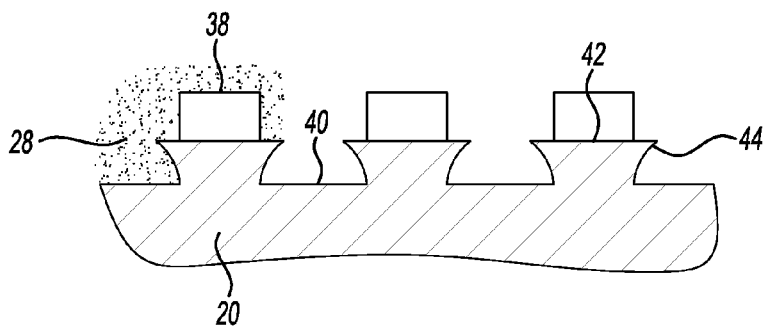
_Fig-4_
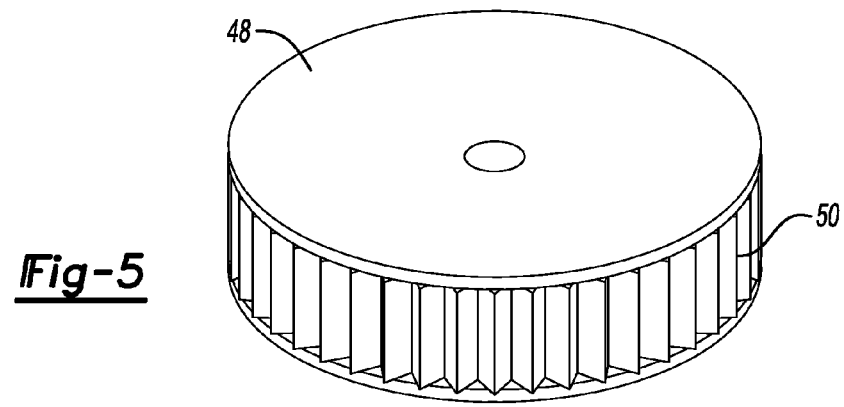
_Fig-5_
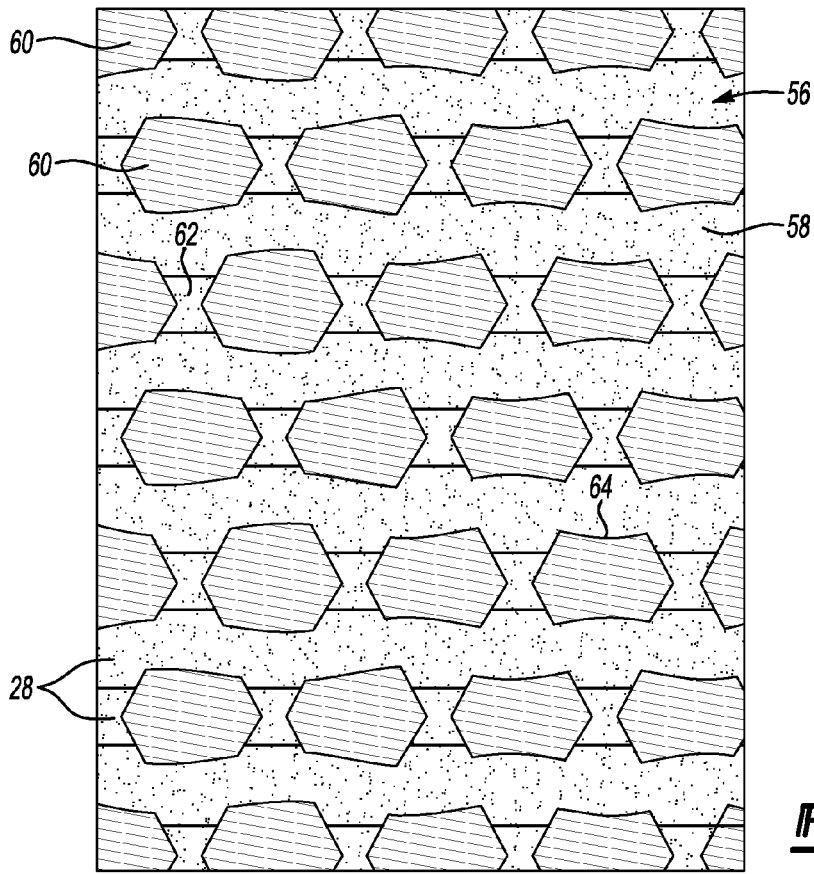
_Fig-6_

METHOD OF MAKING A BARBED SURFACE FOR RECEIVING A THERMAL SPRAY COATING AND THE SURFACE MADE BY THE METHOD

CROSS-REFERENCE TO RELATED APPLICATION

This application is a divisional of U.S. application Ser. No. 13/219,905 filed Aug. 29, 2011, now U.S. Pat. No. 8,534,256, issued: Sep. 17, 2013 the disclosure of which is incorporated in its entirety by reference herein.

TECHNICAL FIELD

This disclosure relates to a method of preparing a surface to receive a thermal spray coating and the structure of the surface so prepared and also with the thermal spray coating applied to the surface.

BACKGROUND

Internal combustion engines having a cast aluminum block may be manufactured with cast iron liners that provide a durable wear surface that is contacted by the engine's pistons and rings. Liners for 4 to 8 cylinders add substantial weight to the engine that reduces fuel economy.

Thermal spray processes are used to provide a hard smooth surface on a base material. Both cylindrical surfaces, such as cylinder walls of combustion engines, and flat surfaces, such as brake discs, may be provided with a thermal spray coating. Surface preparations are required to provide adequate long term adhesion between the base material and the thermally sprayed surface. Creation of undercuts in this application typically involves use of tooling with multiple inserts with very fine features. Tooling to produce these undercuts is generally characterized by high cost and/or short life.

Preparing a surface to receive a thermal spray coating is problematic and costly. The surface receiving the thermal spray coating must be roughened, typically by grit blasting or by being specially machined to create continuous undercuts along the length of very small grooves. Tool wear for specialized broaching or machining tools requires frequent tool replacement. Additional process steps and removing machining chips and debris adds to the cost of the process and, if the surface is not properly prepared, imperfections may be created that may reduce adhesion of the thermal spray coating that can cause scrap or reduced coating life.

Another method of ensuring adhesion is to use flux or application of a chemical bond coat prior to applying the thermal spray material. Chemical bonding and fluxing preparations add to the cost of manufacturing and may involve the use of hazardous materials.

The method of preparing a surface to receive a thermal spray coating and the structure of the surface prepared and coated with the thermal spray developed by applicants are directed to solving the above problems and other problems relating to surface preparations will be apparent to those of ordinary skill in the art. The solutions proposed by applicants are summarized below.

SUMMARY

According to one aspect of the disclosure, a method is disclosed for preparing a surface for mechanically securing a spray coating to the surface. The method comprises cutting a first series of grooves in the surface, rolling a second series of grooves in the surface intersecting the first series and thereby forming a plurality of spaced apart barbs into the first series of grooves at the intersections and spray coating the surface and mechanically securing the spray coating to the barbs.

Other aspects of the method may include forming the first series of grooves by cutting a circumferential thread into a cylindrical wall of a cylinder wall and forming the second series of grooves with a knurling tool that intersect the first series of grooves at an angle that is offset from perpendicular by any lead angle of the thread. In another embodiment, the method may include forming the first series of grooves by cutting a plurality of concentric ring shaped grooves into the cylindrical wall of the cylinder wall and forming the second series of grooves with a fine tooth straight knurling tool that perpendicularly intersect the first series of grooves. Alternatively, the second series of grooves may be formed by a fine tooth diamond pattern knurling tool. Either type of knurling tool may have teeth that are spaced apart by 0.2 mm.

Additional aspects of a specific method that is disclosed that relates to manufacturing an engine block may further comprise selecting a cast aluminum cylinder block that defines a plurality of cylinders that each include a cylinder wall. The first set of grooves is formed primarily in a peak wear portion of the cylinder wall that is designed to be engaged by a piston ring of a piston that is to be subsequently assembled to the engine. The second set of grooves is also formed primarily in the peak wear portion of the cylinder bore wall. The first and second sets of grooves are spaced from the top deck face and crankcase of the cylinder block to minimize the adverse effects of any overspray when the process is completed by spraying molten steel onto the entire cylinder wall. The cylinder wall is provided directly on the cylinder block without a cylinder liner to improve engine efficiency and fuel economy by reducing the weight of the engine as a result of not including any cylinder liners in the cylinder block.

Another aspect of the disclosure relates to the surface prepared by the above method to receive the molten spray coating. A plurality of barbs are formed at a plurality of spaced locations. The barbs partially overhang a first series of grooves. The spray coating is applied to the surface and is mechanically attached to the barbs.

Other aspects relating to the structure and form of the surface may include that the surface is an inner surface of a cylinder bore of an engine. The surface may be essentially limited to the portion of the inner surface of the engine cylinder bore that is engaged by a piston ring of a piston of the engine. The surface preparation and flame spray coating does not extend to the top deck face or the crankcase to minimize the possibility of overspray in these areas. The surface may be aluminum and the first and second series of grooves may be coated with a molten steel spray that attaches to the undercut portion.

In another embodiment of the disclosure, the surface may have first and second grooves that have different depths. The first series of grooves is cut to a first depth and the second series of grooves is rolled to a second depth that is less than the first depth.

According to another aspect of the disclosure, the surface may also be used in other applications for surfaces prepared for thermal spray coating, for example, the surface may also be a flat surface such as a brake disc.

The above aspects of the disclosure and other aspects will be apparent to those of ordinary skill in the art of preparing surfaces for receiving thermal spray coatings.

BRIEF DESCRIPTION OF THE DRAWINGS

FIG. 4 is a cross-sectional view taken along the line 4-4 in FIG. 3;

FIG. 5 is a perspective view of a fine-tooth straight knurling wheel;

FIG. 6 is a fragmentary diagrammatic view of a surface prepared with a first and second set of grooves with the second set of grooves being formed by a fine-tooth diamond knurl roller;

DETAILED DESCRIPTION

Detailed embodiments of the present invention are disclosed that are merely exemplary of the invention that may be embodied in various and alternative forms. The figures are not necessarily to scale and some features may be exaggerated or minimized to show details of particular components. Specific structural and functional details are not to be interpreted as limiting, but merely as a representative basis for teaching one skilled in the art how to practice the present invention.

Figure 1:
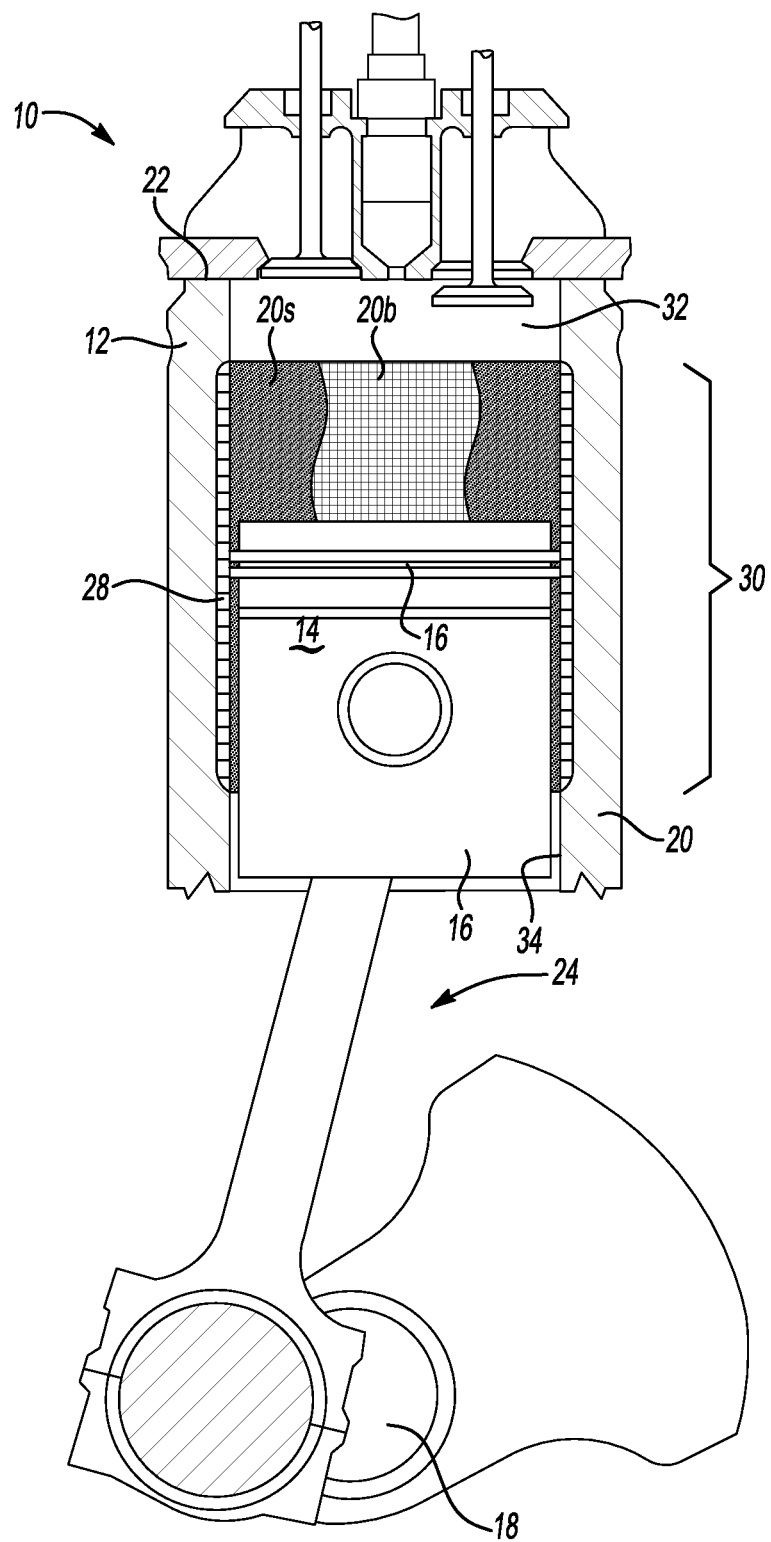
FIG. 1 is a fragmentary diagrammatic view of an engine showing the block, piston and crankshaft partially in cross section.

Referring to FIG. 1, a portion of an engine 10 is illustrated that includes the cylinder block head 12, a piston 16 and crankshaft 18. The piston 16 is shown adjacent a cylinder wall 20. The cylinder wall 20 extends from the top deck face 22 to the crank case 24.

A thermal spray coating 28 is applied to the cylinder wall 20 in a piston ring travel area 30. The thermal spray coating 28 is applied to a barbed prepared surface 20b that is honed after the thermal spray is applied to provide a smooth surface 20s. The piston ring travel area 30 is the area of the cylinder wall 20 that is engaged by a set of piston rings 16 as the piston 14 reciprocates within the cylinder wall 20.

Spacing 32 is provided between the thermal spray coating 28 and the top deck face 22. Spacing 34 is also provided between the thermal spray coating 28 and the crank case 24. The spacing between the piston ring travel area and the top deck face is approximately 3 to 5 mm and the spacing between piston ring travel area 30 and the crank case is approximately 13 to 15 mm. Spacing 34 may also be referred to as a hone clearance area that is provided to allow for clearance for operation of a honing tool.

Figure 2:
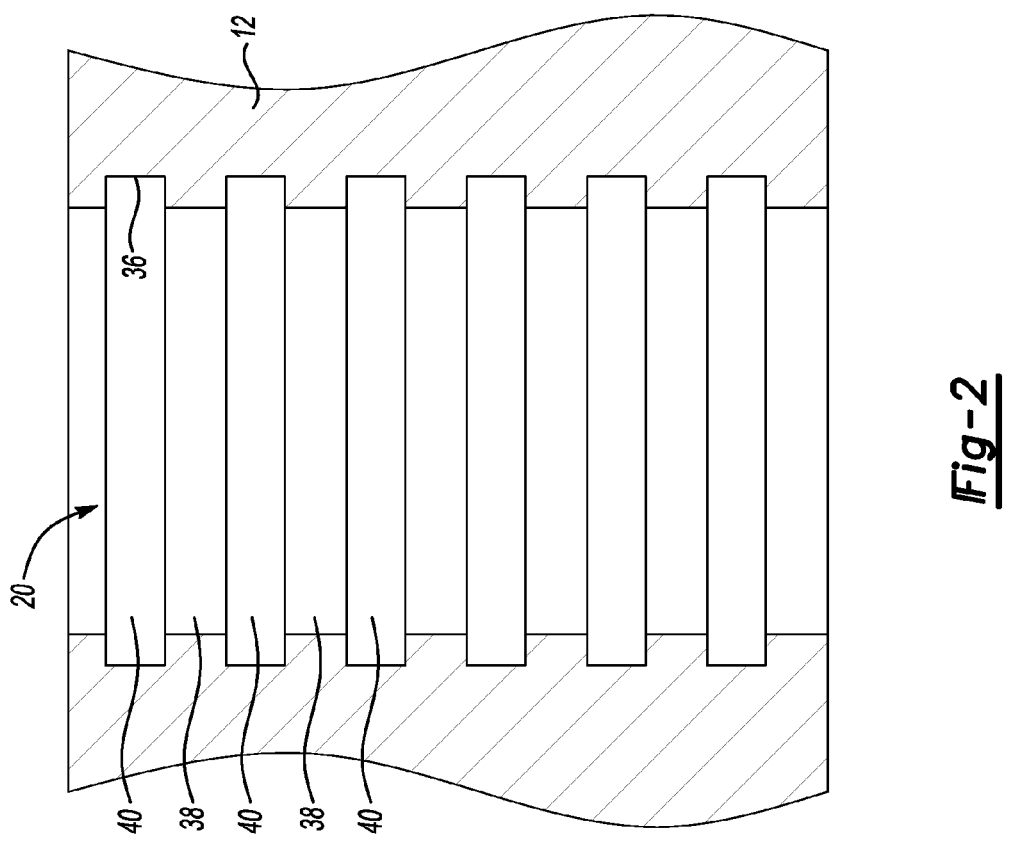
FIG. 2 is a fragmentary diagrammatic cross-section view of an engine block cylinder with a first set of grooves cut into the cylinder wall.

Referring to FIG. 2, a portion of a cylinder wall 20 is shown with a portion of the cylinder block 12 in cross section. The cylinder wall 20 is shown with a first set of cut grooves 36. It should be understood that the grooves may be concentric grooves or threads that are cut into the cylinder wall 20 with a cutting tool in a machining center. The first set of cut grooves, or threads, 36 include a raised portion 38, or thread, and a recessed portion 40, or root diameter.

Figure 3:
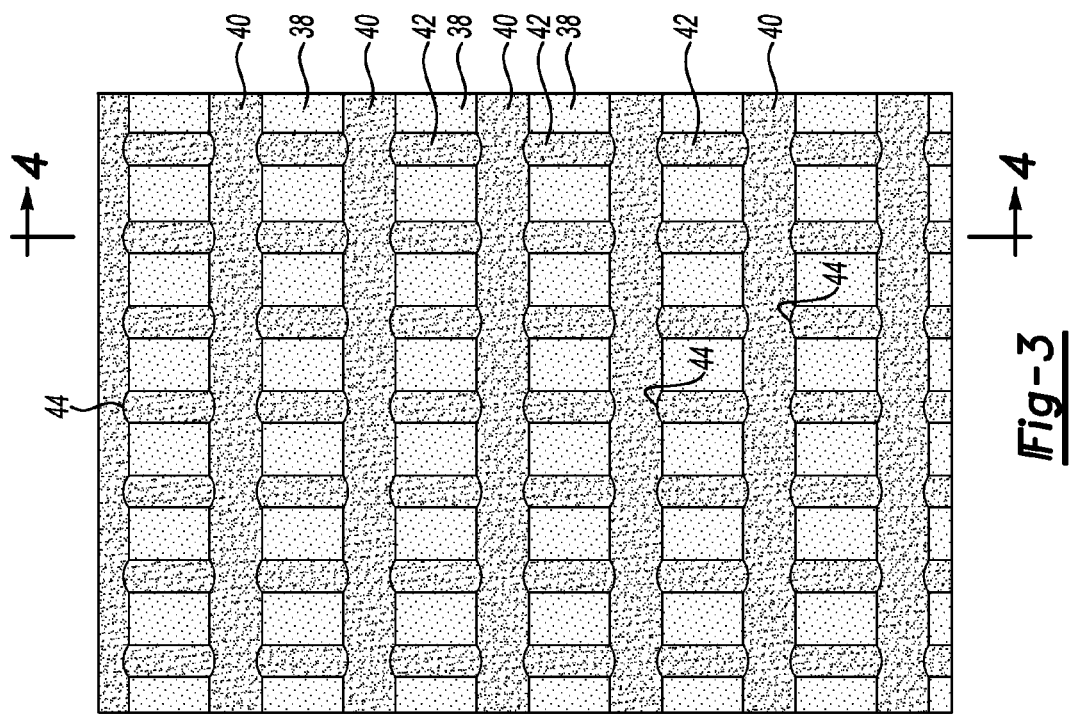
FIG. 3 is a fragmentary diagrammatic view of a surface prepared with first and second sets of intersecting grooves.

Referring to FIG. 3, a surface is illustrated that could be the cylinder wall 20 or could also be representative of a flat brake disc. A first set of grooves 36 is shown with the raised portions 38 and recessed portions 44 alternating axially through the length of the cylinder wall 20. A second set of rolled grooves 42 is shown impressed on the raised portion 38 of the first set of grooves 36. The second set of rolled grooves forms spaced apart barbs 44 that extend slightly over the recessed portion 40. The spaced barbs 44 are spaced from each other. The thermal spray coating 28 is sprayed over the entirety of the cylinder wall 20 and ample clearance is provided between the spaced barbs 44 on opposite sides of the recessed portion 40 and are also spaced apart along the length of the first set of grooves 36 so that ample clearance is provided for the thermal spray coating 28 to flow in and around the spaced barbs 44.

Referring to FIG. 4, the spaced barbs 44 are shown extending outwardly from the surface formed by the first set of rolled grooves 42. The areas between the second set of grooves 42 remains at the height of the raised portion 38 of the first set of grooves 36. The thermal spray coating 28 is shown partially applied over the raised portions 38 and recessed portions 40. The spray coating is also applied in the recessed portion 40 below the spaced barbs 44. In this way, the thermal spray coating 28 is mechanically secured under the spaced barbs 44 to provide a strong mechanical bond between the thermal spray coating 28 and the cylinder wall 20.

Referring to FIG. 5, a fine-tooth straight knurling roller 48 is shown with a plurality of knurling ribs 50 on its outer diameter. The knurling ribs 50 are rolled across the cylinder wall 20 after the first set of grooves 36 is formed in the cylinder wall 20. The knurling ribs 50 form the second set of rolled grooves 42 as previously described.

Referring to FIG. 6, an alternative embodiment is shown of a cylinder wall 56 that is formed with a first set of cut grooves 58, or threads. (FIG. 6 is also representative of a flat brake disc). A second set of diamond knurl groove recesses 60 engage the raised portion 62 of the first set of cut grooves 58 to form spaced barbs 64 that overhang the first set of cut grooves 58 after the first and second set of grooves are formed and the spaced barbs 64 are created. A thermal spray coating 28 may be sprayed over the cylinder wall 56 in the first and second set of grooves. The thermal spray coating 28, shown in FIG. 4, is mechanically locked to the spaced barbs 64 as previously described with reference to FIG. 4.

Figure 7:
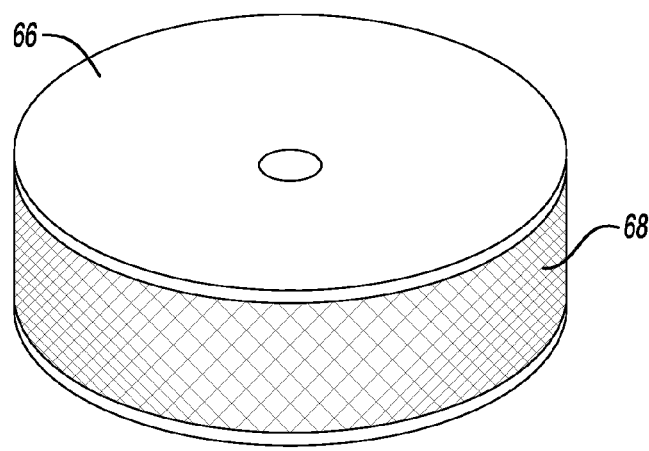
FIG. 7 is a perspective view of a fine-tooth diamond knurl roller.

Referring to FIG. 7, a fine-tooth diamond knurling roller 66 is shown to include a plurality of diagonally intersecting knurling ribs 68.

Figure 8:
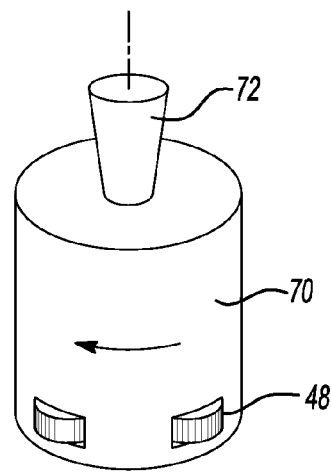
FIG. 8 is a fragmentary diagrammatic cross-section view showing a knurling tool used to form the second set of grooves.
Figure 8:
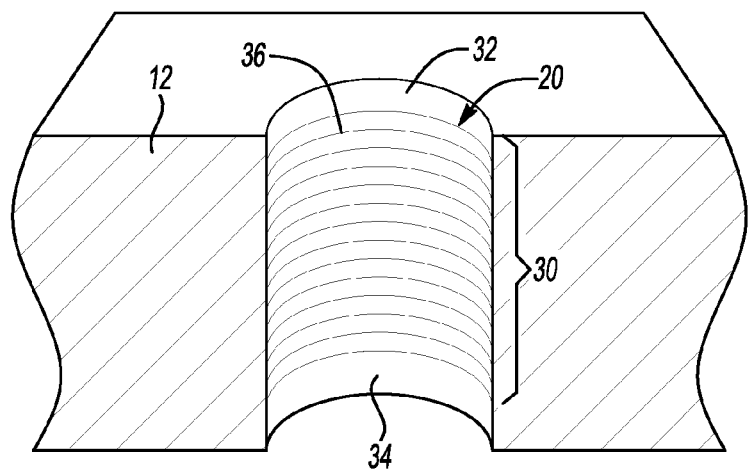

Referring to FIG. 8, an engine block 12 is shown in fragmentary cross section. The cylinder wall 20 is provided with a first set of cut grooves 36 in the piston ring travel area 30. Spacing 32 is provided between the piston ring travel area 30 and the top deck face 22. Spacing 34 is provided between the piston ring travel area 30 and the crank case 24. By providing spacings 32 and 34, the thermal spray coating process may be terminated within the area of the cylinder wall 20 thereby minimizing any over-spray being deposited on the top deck face 22 or crank case 24 (not shown). A knurling roller head 70 is shown disposed above the cylinder block 12 in position to begin forming the second set of rolled grooves 42. The knurling roller head 70 supports a plurality of knurling rollers 48 which alternatively could be a fine-tooth diamond knurling rollers 66, as shown in FIG. 7. An expander 72 is shown diagrammatically within the knurling roller head 70 that may be used to extend and retract the knurling rollers as is well known in the art of honing tools.

The method of preparing a surface such as the cylinder wall 20 in the block 12 of an engine 10 is described below. According to the method, a first series of cut grooves 36 are cut into the cylinder 20 with a cutting tool. The grooves 36 may be concentric circles or a fine lead thread. The raised portions 38 and recessed portions 40 of the grooves 36 may be approximately equal in width in the axial direction. A second series of grooves 42 is rolled into the surface that intersect the first series of grooves 36. A plurality of spaced apart barbs 44 are formed at the intersections of the first and second series of grooves 36, 42. A thermal spray coating 28 is applied to the cylinder wall 20 in the piston ring travel area 30. The piston ring travel area 30 is spaced from the top deck face 22 and is also spaced from the crank case 24. The thermal spray coating 28 flows around the barbs and into the first and second set of grooves 36, 42 and becomes mechanically locked with the spaced apart barbs 44. The second series of grooves may be formed by a fine-tooth straight or diamond patterned knurling tool having teeth that are spaced apart approximately by 0.2 mm.

The cylinder block 12 is preferably a cast aluminum engine block that defines a plurality of cylinders that each include a cylinder wall 20. The first and second set of grooves are formed primarily in a peak wear portion of the cylinder corresponding to the piston ring travel area 30. The thermal spray coating 28 is applied in the piston ring travel area 30 and is spaced from both the top deck face 22 and the crank case 24. The thickness of the thermal spray coating is approximately 150 microns after finishing by appropriate honing or other machining steps.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A spray coated surface comprising:
   a first series of regularly spaced grooves having a first depth;
   a second series of regularly spaced grooves having a second depth that is less than the first depth intersecting the first series of grooves;
   a plurality of barbs formed by the second series of grooves and the first set of grooves partially overhanging the first series of grooves; and
   a spray coating applied and mechanically attached to the barbs.

2. The surface of claim 1 wherein the surface is an inner surface of a cylinder bore defined by a cylinder block.

3. The surface of claim 2 wherein the inner surface is generally limited to the portion of the inner surface of the engine cylinder that is engaged by a piston ring of a piston of the engine.

4. The surface of claim 1 wherein the surface is aluminum and the first and second series of grooves are coated with a molten steel spray that attaches to the barbs.

5. The surface of claim 1 wherein the first depth is between 80 microns and 200 microns and the second depth is between 40 microns and 100 microns.

* * * * *